(12) United States Patent
Yamaguchi et al.

(10) Patent No.: US 9,387,620 B2
(45) Date of Patent: Jul. 12, 2016

(54) DIE AND PROCESS FOR EXTRUSION

(75) Inventors: Toshiaki Yamaguchi, Yokohama (JP); Liang Li, Shanghai (CN); Xing Fan, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 280 days.

(21) Appl. No.: 14/006,473

(22) PCT Filed: Apr. 15, 2011

(86) PCT No.: PCT/CN2011/000663
§ 371 (c)(1),
(2), (4) Date: Dec. 13, 2013

(87) PCT Pub. No.: WO2012/139253
PCT Pub. Date: Oct. 18, 2012

(65) Prior Publication Data
US 2014/0106128 A1    Apr. 17, 2014

(51) Int. Cl.
| | |
|---|---|
| *B29C 47/12* | (2006.01) |
| *B29C 47/00* | (2006.01) |
| B29C 47/06 | (2006.01) |
| B29C 47/90 | (2006.01) |
| B29K 7/00 | (2006.01) |
| B29K 9/06 | (2006.01) |
| B29K 21/00 | (2006.01) |
| B29K 23/00 | (2006.01) |
| B29K 25/00 | (2006.01) |

(Continued)

(52) U.S. Cl.
CPC ........... *B29C 47/128* (2013.01); *B29C 47/0019* (2013.01); *B29C 47/0088* (2013.01); *B29C 47/12* (2013.01); *B29C 47/065* (2013.01); *B29C 47/90* (2013.01); *B29K 2007/00* (2013.01); *B29K 2009/06* (2013.01); *B29K 2021/003* (2013.01); *B29K 2023/06* (2013.01); *B29K 2023/12* (2013.01); *B29K 2025/06* (2013.01); *B29K 2027/06* (2013.01); *B29K 2105/0008* (2013.01); *B29K 2105/0026* (2013.01); *B29K 2105/0032* (2013.01); *B29K 2105/0044* (2013.01); *Y10T 428/24479* (2015.01)

(58) Field of Classification Search
None
See application file for complete search history.

(56) References Cited

U.S. PATENT DOCUMENTS

| | | | | | |
|---|---|---|---|---|---|
| 3,474,495 | A | * | 10/1969 | Deutsch | ........... B29C 47/30 425/113 |
| 4,465,454 | A | * | 8/1984 | Duerr | ........... B28B 3/269 264/177.11 |

(Continued)

FOREIGN PATENT DOCUMENTS

| | | |
|---|---|---|
| CN | 2085720 | 10/1991 |
| CN | 201455032 | 5/2010 |

(Continued)

*Primary Examiner* — Jeffrey Wollschlager
(74) *Attorney, Agent, or Firm* — Yong Tu; Stephen A. Baehl

(57) ABSTRACT

The present disclosure is related to a die suitable for extrusion of thermoplastic vulcanizate, in particular for co-extrusion of multiple materials comprising a thermoplastic vulcanizate. The die comprises a pool die plate, an orifice die plate, and a profile die plate. By utilizing the die according to the present disclosure in extrusion, the flow of extrudate can be well controlled and balanced due to the design of flow pool and through orifice, thereby an extruded article achieves good shape performance, for example, good surface smoothness, and an undesired effect like edge tear, warpage, die moustache, silver line in the extrusion can be avoided.

6 Claims, 6 Drawing Sheets

(51) Int. Cl.
*B29K 27/06* (2006.01)
*B29K 105/00* (2006.01)

(56) References Cited

U.S. PATENT DOCUMENTS

| | | | | |
|---|---|---|---|---|
| 5,204,035 | A * | 4/1993 | Boltze | B29C 47/003 |
| | | | | 264/146 |
| 6,119,324 | A * | 9/2000 | Suess | B26D 3/001 |
| | | | | 264/145 |
| 6,168,409 | B1 * | 1/2001 | Fare | B29C 47/128 |
| | | | | 264/172.15 |
| 2007/0043172 | A1 * | 2/2007 | Ellul | C08L 23/16 |
| | | | | 525/192 |
| 2008/0033089 | A1 * | 2/2008 | Ellul | C08F 210/18 |
| | | | | 524/322 |
| 2009/0104301 | A1 * | 4/2009 | Birkholz | D01D 4/06 |
| | | | | 425/198 |
| 2010/0029161 | A1 * | 2/2010 | Pourdeyhimi | D01D 5/0985 |
| | | | | 442/329 |

FOREIGN PATENT DOCUMENTS

| | | |
|---|---|---|
| CN | 201552703 | 8/2010 |
| CN | 201776895 | 3/2011 |
| CN | 201776895 U | 3/2011 |

* cited by examiner

DIE AND PROCESS FOR EXTRUSION

PRIORITY CLAIM

This application is a National Stage Application of International Application No. PCT/CN2011/000663, filed Apr. 15, 2011, the disclosure of which is hereby incorporated by reference in its entirety.

FIELD OF THE INVENTION

The present disclosure relates to a die suitable for extrusion molding of a thermoplastic vulcanizate, and in particular for co-extrusion molding of multiple materials including thermoplastic vulcanizate.

BACKGROUND OF THE INVENTION

A thermoplastic vulcanizate ("TPV") can be used for weather seal application, for example, application in automobile sealing strip, due to its sealability, good surface appearance, durability, etc.

Method for making TPV-containing articles includes extrusion molding. However, since the rheology behaviors of TPVs differ from each other, in the extrusion of cured thermoplastics and thermoplastic elastomer compositions some undesired phenomena occurs, for example, an accumulation of material often appears at the surface of the die, which is often referred to as die "drool" or die "mustache", and the phenomena of edge tear, silver line etc. Additionally, in a co-extrusion process of TPV and a thermoplastic material, due to difference of rheology behavior of multiple materials, it is even easy to generate unwanted phenomena. Further, when a target profile has an irregular shape or dimension, it is very difficult to achieve an excellent shape performance of extruded article. The shape and more specifically, the consistency of the shape, imparted to the molten TPV as it passes through the extruder die is dependent on not only the smoothness of the die, but also the balance of flow of extrudate. One way to control the shape and dimension of extruded article and avoid mainly relies on the controlling of the rheology behaviors of thermoplastic vulcanizate during the extrusion process.

It is desirable to provide a die suitable for extrusion or co-extrusion molding of TPV-contained article, which can effectively control and balance the flow of extrudate of different materials so as to produce an article with good shape performance and reduce occurrence of undesired phenomena during extrusion.

In addition, shaping the extruded article usually needs cooling. Since different materials have their own shaping behaviors, the shaping of a article made of two or more materials including a TPV, in particular with an irregular shape, become difficult. Thus, it is also desirable to provide a sizer during the cooling process to control the shaping of extruded article so as to achieve an excellent shape performance of cooled article.

SUMMARY OF THE INVENTION

In the first aspect the present disclosure provides a die suitable for use in extrusion molding comprising:

a pool die plate comprising a pool die plate flow pool, a flow groove in the pool die plate in communication with said pool die plate flow pool, and an pool die plate through orifice extending through the pool die plate for receiving at one side an extrudate from an extruder head and distributing the extrudate to said flow groove at another side, said pool die plate flow pool and said flow groove disposed in the same surface of the pool die plate;

an orifice die plate arranged in use of the die adjacent said pool die plate and comprising at least one orifice die plate flow pool and a plurality of through orifices extending through said orifice die plate from one side to another and in communication with said pool die plate flow pool and said orifice die plate flow pool, said orifice die plate flow pool grooved into the surface of said orifice die plate; and a profile die plate arranged in use of the die adjacent said orifice die plate and comprising a profile die plate flow channel for forming a target profile, said profile die plate flow channel extending through said profile die plate from one side to another and in communication with said orifice die plate flow pool.

In one embodiment of the die according to the first aspect of the present disclosure, the die further comprises:

a separator die plate arranged in use of the die between said orifice die plate and said profile die plate and comprising a separator die plate flow channel and at least one separating wall disposed into said separator die plate flow channel along flow direction of extrudate, said separator die plate flow channel extending through said separator die plate from one side to another and in communication with said orifice die plate flow pool and said profile die plate flow channel.

In another embodiment of the first aspect the present disclosure, the die is further suitable for use in co-extrusion molding of materials including a TPV, and comprises:

a primary pool die plate and at least one secondary pool die plate, each of said pool die plates comprising a pool die plate flow pool, a flow groove in said pool die plates in communication with said pool die plate flow pool, and an through orifice extending through said pool die plates for receiving at one side an extrudate from an extruder head and distributing the extrudate to said flow groove at another side, said pool die plate flow pool and said flow groove disposed in the same surface of said pool die plates;

a primary orifice die plate and at least one secondary orifice die plate respectively arranged in use of the die adjacent said primary orifice die plate and said secondary pool die plate, each of said orifice die plates adjacent said pool die plate and comprising a orifice die plate flow pool and a plurality of through orifices extending through said orifice die plate from one side to another and in communication with said pool die plate flow pool and said orifice die plate flow pool, said orifice die plate flow pool grooved into one surface of said orifice die plate; and a profile die plate arranged in use of the die adjacent both said primary orifice die plate and said secondary orifice die plate and comprising a profile die plate flow channel for forming a target profile, said profile die plate flow channel extending through said profile die plate from one side to another and in communication with said orifice die plate flow pools.

In yet another embodiment, the die suitable for use in co-extrusion molding further comprises:

a primary separator die plate arranged in use of the die between said primary orifice die plate and said profile die plate and at least one secondary separator die plate arranged in use of the die between said secondary orifice die plate and said profile die plate, each of said separator die plates comprising a separator die plate flow channel and at least one separating wall disposed into said separator die plate flow channel along a flow direction extrudate, said separator die plate flow channel extending through said separator die plate from one side to another and in communication with said orifice die plate flow pool and said profile die plate flow channel.

In the second aspect the present disclosure provides a process for extrusion molding of article comprising steps:

a) forming an extrudate in an extruder having a die;

b) passing the extrudate from one side of a pool die plate of the die into a flow pool grooved in another side of said pool die plate;

c) passing the extrudate through a plurality of through orifices disposed in an orifice die plate of the die from one side into a flow pool grooved in another side of said orifice die plate; and d) passing the extrudate through a flow channel disposed in a profile die plate of the die to form an article with target profile.

In one embodiment the process of second aspect of present disclosure further comprises between steps c) and d) the step of c'): passing the extrudate through a flow channel which is disposed in a separator die plate of the die, which is arranged in use of the die between said orifice die plate and said profile die plate of the die, and is divided by at least one separating wall disposed into said flow channel along a flow direction of extrudate.

In another embodiment the die in the process of second aspect of present disclosure is the die of the first aspect of the present disclosure.

In the third aspect the present disclosure provides an article make by using the die according to the first aspect and/or by process according to the second aspect of present disclosure.

In the fourth aspect the present disclosure provides a sizer suitable for effectively maintaining the shape and dimension of extruded article comprising a plurality of elements which can be arranged to form a channel through which, in use, the extruded article passes through, wherein a vacuum zone is disposed in the elements at a position close to the channel.

In the fifth aspect the present disclosure provides a process for maintaining shape of an extruded article comprising a step of passing the extruded article through the sizer according to the eighth aspect of present disclosure.

One advantage of utilizing the dies or the processes for extrusion according to the present disclosure, the flow of extrudate in the die can be well controlled and balanced due to the design of flow pool and through orifice, thereby achieves an extruded article with good shape performance, for example, good surface smoothness, no edge tear, slight or no warpage, no silver line in the extrusion, and reduces the occurrence of die mustache as well. In addition, in combination with the sizer, the shape and dimension of final profile made can be maintained during the cooling process followed to the extrusion.

BRIEF DESCRIPTION OF DRAWINGS

The disclosure, as well as the preferred embodiments, and objectives and advantages thereof, will be described in conjunction with the accompanying drawings, wherein:

FIGS. 1A and 1B is a schematic diagram of a die composed of a pool die plate 10, an orifice die plate 20, a separator die plate 30, and a profile die plate 40 in one embodiment according to the present disclosure, in which FIG. 1A is observed at the side from where the extrudate exits from each of die plates, and FIG. 1B is observed at the side from where the extrudate enter into each of die plates;

DETAILED DESCRIPTION OF THE INVENTION

Figure 1A:
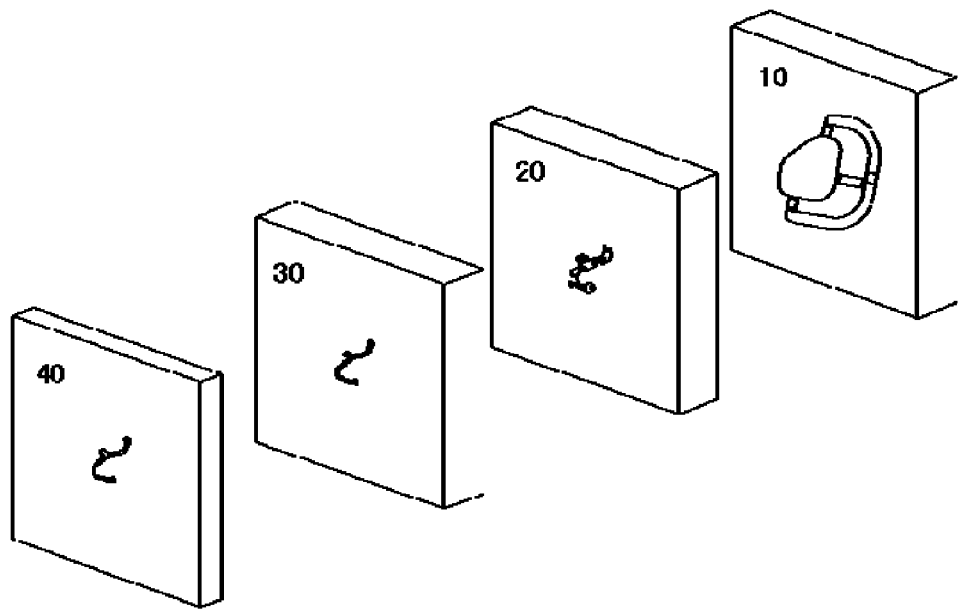

Various specific embodiments of the invention will now be described, including preferred embodiments and definitions that are adopted herein. While the following detailed description gives specific preferred embodiments, those skilled in the art will understand that these embodiments are exemplary only, and the invention can be practiced in other ways.

As used herein an "extruder" refers to any types of apparatus that is capable of blending and conveying materials such as thermoplastics materials (e.g., thermoplastic vulcanizate, polyethylene, polypropylene, etc.,) by imposing enough sheer to melt the materials and create a blend of the materials. An "extrudate" refers to materials that are blended, melt and extruded through the extruder. A "die" refers to a combination of a plurality of die plates detachably mounted in sequence.

Materials

The die of present disclosure is particularly suitable for extrusion of a thermoplastic vulcanizate (TPV) or co-extrusion of a thermoplastic vulcanizate and/or other known thermoplastic materials including, but not limited to, polyethylene (PE), polypropylene (PP), polystyrene (PS), thermoplastic olefin (TPO), thermoplastic elastomer (TPE), PVC and there blends or compounds.

In one embodiment, the thermoplastic vulcanizates are prepared by dynamically curing a rubber with a curing agent while the rubber is mixed with a thermoplastic polymer. The resulting composition includes a crosslinked or cured, or partial crosslinked or cured phase and an uncrosslinked phase. The crosslinked or partial crosslinked or cured phase includes a crosslinked or partial crosslinked rubber, and the uncrosslinked phase includes a thermoplastic polymer.

Rubbers include those polymers that are capable of being cured or crosslinked by curing agent, for example, peroxides. Reference to a rubber may include mixtures of more than one rubber. Non-limiting examples of rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof.

In one or more embodiments, olefinic elastomeric copolymers include ethylene-propylene rubbers, propylene-based rubbery copolymers, and ethylene-based plastomers or elastomer. The ethylene-propylene rubber refers to rubbery copolymers polymerized from ethylene, at least one α-olefin monomer, and optionally at least one diene monomer. The propylene-based rubbery copolymer, which may also be referred to as propylene-α-olefin copolymers, include units (i.e., mer units) derived from propylene, one or more comonomer units derived from ethylene or α-olefins. The ethylene-based plastomers or elastomer, which may also be referred to as ethylene-α-olefin copolymers, include copolymers of ethylene and one or more α-olefin comonomers. Herein a α-olefin has carbon atoms less than 20.

In one or more embodiments, butyl rubber includes copolymers and terpolymers of isobutylene and at least one other comonomer, for example, isoprene.

Any thermoplastic resin that can be employed in the manufacture of thermoplastic vulcanizates of this invention. Useful thermoplastic resins may include solid, generally high molecular weight plastic resins. In one or more embodiments, these thermoplastic resins include un-functionalized resins. In other embodiments, the thermoplastic component of the thermoplastic vulcanizate may include a functionalized resin.

In one or more embodiments, the thermoplastic vulcanizates may include a mineral oil, a synthetic oil, or a combination thereof. These oils may also be referred to as plasticizers or extenders. In one or more embodiments, the extender oils may include organic esters, alkyl ethers, or combinations thereof. In certain embodiments, the thermoplastic vulcanizate may include a polymeric processing additive.

In addition to the rubber, thermoplastic resins, and optional processing additives, the thermoplastic vulcanizates of the present disclosure may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black and the like.

The cure agent (or "curative") useful in the present invention is directed to peroxide, and more particularly, organic peroxide curatives known in the art. In addition to the peroxide, other cure adjuvants or coagents can be used.

In one or more embodiments, the rubber is cured or crosslinked using the curative by dynamic vulcanization. The term "dynamic vulcanization" refers to vulcanization or curing process for a rubber contained in a blend with a thermoplastic resin, wherein the rubber is crosslinked or partial crosslinked or vulcanized under conditions of high shear at a temperature above the melting point of the thermoplastic.

Extruder

The extruder may be any suitable instruments known in the art, such as a single, double, triple, or more barrel extruder. In one embodiment, the extruder is a single barrel extruder. In yet another embodiment, the extruder is a double barrel extruder, and in yet another embodiment the extruder is a multi-barrel extruder. In one embodiment the extruder is smooth barrel. In yet other embodiments, the extruder is a grooved barrel. It is important to produce a high shearing action in the extruders.

The screw may be any suitable instruments known in the art as long as a high shearing action can be produced in the extruders, such as a general purpose screw which does not provide reinforced shearing force, a pin screw, a Maddock type screw, or a barrier screw. In a preferable embodiment the screw is a barrier screw. While in another preferable embodiment, a Maddock type screw can be used. It is also preferable to select the extruder having a ratio of length to diameter more than 20.

The blending of materials in the extruder is generally performed at a temperature not exceeding about 400° C., preferably not exceeding about 300° C. and more particularly not exceeding about 250° C. The minimum temperature at which the melt blending is performed is generally higher than or equal to about 130° C., preferably higher than or equal to about 150° C. and more particularly higher than about 180° C. The blending time is chosen by taking into account the nature of the compounds used in the TPV composition and the blending temperature. The time generally varies from about 5 seconds to about 120 minutes, and in most cases from about 10 seconds to about 30 minutes.

Die

The materials are blended in the extruder and then extruded into a die, which will be explained below referring to the exemplary FIGS. 1 to 6. Each of individual die plates can be made of materials known to the art to accomplish any necessary purpose. Typical materials include but not limits to normal steel, stainless steel and alloys.

Figure 1B:
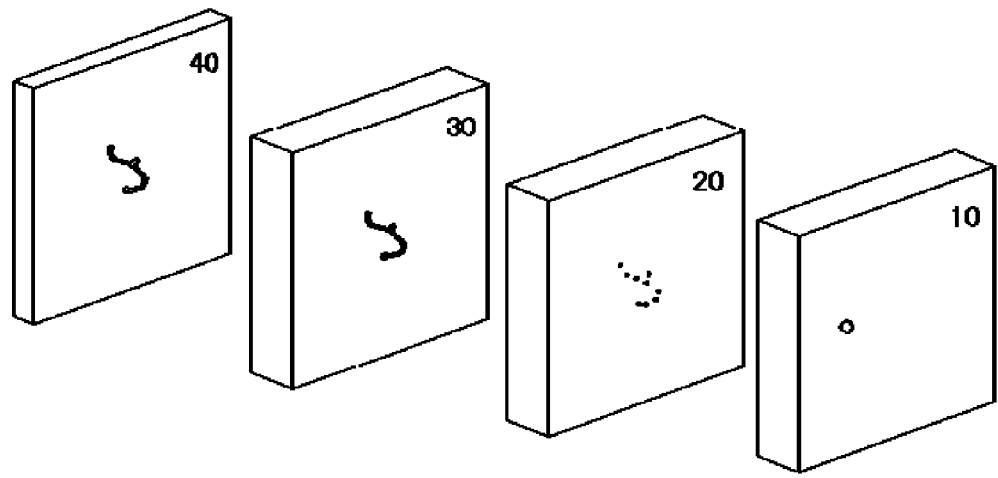

In one embodiment the present disclosure is directed to a die comprising in sequence a pool die plate 10, an orifice die plate 20, a separator die plate 30 (optional), and a profile die plate 40, as illustrated in the FIG. 1. The profile die plate is arranged farthest from the extruder.

Figure 2:
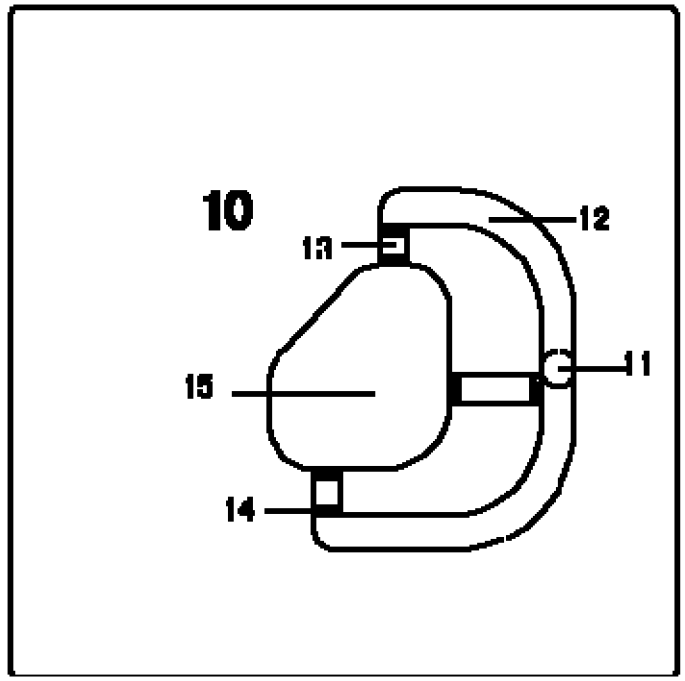
FIG. 2 is a schematic diagram of flow channel design on a side of a pool die plate where the extrudate exits in one embodiment according to the present disclosure.

Referring to the FIG. 2, in one embodiment the pool die plate 10 comprises a through orifice 11 (hereinafter "pool die plate through orifice 11") for receiving an extrudate from an exit of the extruder (not shown). The pool die plate through orifice 11 extends through the pool die plate 10 and has an entrance opening and an exit opening disposed on different sides, preferably on two opposite sides of the pool die plate 10. One opening is communicated to a flow groove 12 and the other is communicated with the exit of the extruder, for example, an opening on an extruder head (or any other extrudate-transmitting devices, for example, an adaptor). The flow groove 12 is communicated with a flow pool 15 (hereinafter "pool die plate flow pool 15"). The flow groove 12, and the pool die plate flow pool 15 are disposed on one side and grooved into the surface with a certain depth.

In one embodiment the extrudate is received from the pool die plate through orifice 11 and then flows through the flow groove 12, and then to the flow pool 15. In yet another embodiment branch flow grooves 13 is in the pool die plate 10. disposed for in communication with the flow groove 12 and the flow pool 15. The branch flow groove 13 is disposed in the same surface as the flow groove 12 and flow pool 15. In this case, the extrudate flows through the pool die plate through orifice 11 to the flow groove 12, the branch flow groove 13, and then is distributed to the flow pool 15, as illustrated in FIG. 2.

There are no particular limitations to the depth of the flow groove 12, the branch flow groove 13, or the pool die plate flow pool 15 and a skilled artisan can easily choose a suitable depth for different purpose. In one embodiment the flow groove 12, the branch flow groove 13, and the pool die plate flow pool 15 had substantially the same depth. In another embodiment the flow pool 15 is grooved deeper than the flow groove 12 and the branch flow groove 13. While in some embodiments, it is possible to groove the flow pool 15 in a less depth than the communicated flow groove 12 or the branch flow groove 13 as long as the pressure generated by the flow of extrudate in the grooves 12 and 13 does not make the pool die plate 10 separated from adjacent die plate, for example, the orifice die plate 20.

The flow grooves 12 and branch flow groove 13 are not specified in any particular shape and size and a skilled artisan can easily choose a suitable shape and size for different target profile. Typically the flow grooves 12 and 13 have a cross section of a D shape or a rectangle.

In some embodiments it is preferably to dispose a choke portion 14 at the flow grooves 12 and/or the branch flow groove 13 so as to adjust the flow rate in the grooves and balance the flow of extrudate into the pool die plate flow pool 15. The choke portion 14 is protruded in an appropriated height from the bottom of the grooves, and can be disposed at any positions of the grooves 12 and 13, and is not limited to any shapes or sizes. In one embodiment the choke portions 14 are disposed at the ends of the branch flow grooves 13, as illustrated in the FIG. 2.

In the pool die plate 10 the extrudated is introduced by the entrance opening of the pool die plate through orifice 11 from the extruder and converged in the pool die plate flow pool 15 and then flows to the orifice die plate 20 adjacent the pool die plate 10.

Figure 3:
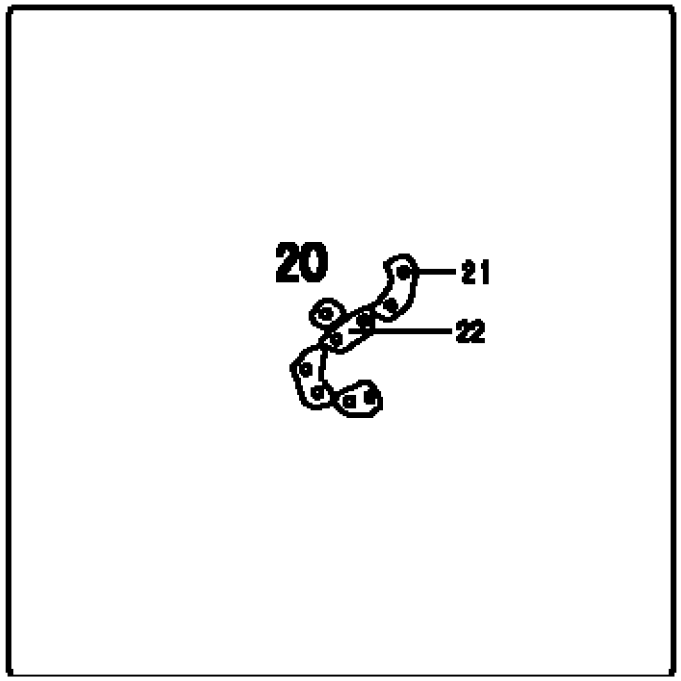
FIG. 3 is a schematic diagram of flow channel design on a side of an orifice die plate where the extrudate exits in one embodiment according to the present disclosure.

Referring to the FIG. 3, in one embodiment the orifice die plate 20 comprises a plurality of through orifice 21 (hereinafter "orifice die plate through orifice 21") extending through the orifice die plate 20 and at least one flow pool 22 (hereinafter "orifice die plate flow pool 22"). Each of the orifice die plate through orifices 21 has an entrance opening and an exit opening disposed at different sides, preferably on two opposite sides of the orifice die plate 20. The entrance opening is in communication with the pool die plate flow pool 15 and the exit opening is in communication with the orifice die plate flow pool 22, and thus through the orifice die plate through orifices 21 the extrudate is divided into a plurality of small streams and equably distributed from the pool die plate flow pool 15 to the orifice die plate flow pool 22.

The orifice die plate flow pool 22 is grooved in the surface of orifice die plate 20 with a certain depth. There is no particular limitation to the depth of the orifice die plate flow pool 22 and a skilled artisan can easily choose a suitable depth upon different materials and purpose.

The diameter of orifice die plate through orifices 21 is not limited to any specific ranges. Herein the "diameter" refers to the greatest dimension of a cross section of the through orifice 21 along a direction vertical to the flow direction of extrudate, and can be varied from the different cross section. Generally greater is the viscosity of extrudate, greater is the diameter of orifice die plate through orifice 21 so as to prevent the through orifice 21 from being blocked. Typically the diameter ranges from 0.1 mm to 5.0 mm, or from 0.5 mm to 3.0 mm, or from 0.5 mm to 2.5 mm, or from 1.0 mm to 2.5 mm. In one embodiment the diameters of orifice die plate through orifices 21 are the same. In yet another embodiment, the diameters of orifice die plate through orifices 21 can be different from each other, for example, when the flow rate differs in the different orifice die plate through orifice 21, to keep a balance of flow of extrudate, the diameter of orifices may be adjusted by grinding with a drill to increase the diameter or jointing with a metal sheet, or the like which has a higher melt temperature than that of extrudate temperature, to reduce the diameter of the orifice, by doing this, the flow rates in the orifice die plate through orifices 21 can be controlled to be substantially the same.

The quantity of the orifice die plate through orifice 21 was not particularly limited. It will be preferable to set up the through orifices as much as possible. The distribution of end-openings of through orifices 21 at orifice die plate flow pool 22 can be in any manners. In one embodiment the exit openings of through orifices 21 are homogeneously distributed. In yet another embodiment the exit openings of through orifices 21 are distributed denser in the periphery area of flow pool 22 than those arranged at the center area of the flow pool 22.

The orifice die plate flow pool 22 is not specifically limited to any shapes. The dimension of the orifice die plate flow pool is about 1.0 to 10.0 times, or about 1.5 to 8.0 times, or about 2.0 to 4.0 times the dimension of target profile. At the position corresponding to the thinnest part of the target profile, it is preferably at least about 1.2 times, or about 1.5 times, or about 1.8 times the dimension of target profile.

By distributing the extrudate through the orifice die plate through orifice 21 arranged in orifice die plate 20, the extrudate is converged in the orifice die plate flow pool 22 and then flows to the separator die plate 30.

Figure 4:
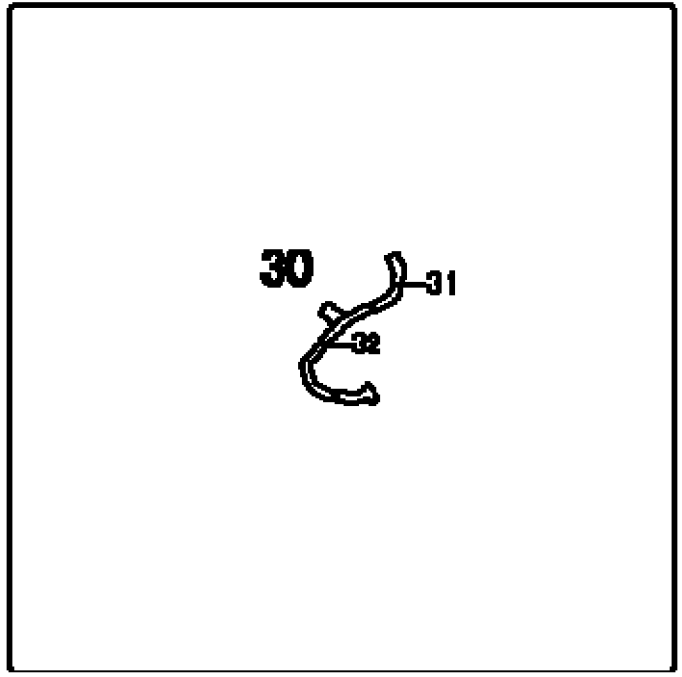
FIG. 4 is a schematic diagram of flow channel design on a side of a separator die plate where the extrudate exits in one embodiment according to the present disclosure.

Referring to the FIG. 4, in one embodiment the separator die plate 30 comprises a flow channel 31 (hereinafter "separator die plate flow channel 31") extending through the separator die plate 30 from one side to another side. That is, the separator die plate flow channel 31 has an entrance opening and an exit opening disposed on different sides, preferably on opposite sides of the separator die plate 30. The entrance opening of separator die plate flow channel 31 is in communication with said orifice die plate flow pool 22. The separator die plate 30 flow channel 31 was divided into two or a plurality of small flow channels by at least one separating wall 32 disposed therein extending along the flow direction of extrudate. The separating walls 32 have a length along the flow direction of extrudate not greater than that of the separator die plate flow channel 31. The separating wall 32 can be disposed at any desired positions. In one embodiment the separating walls 32 are disposed at the positions corresponding to the boundaries of two parts of target profile having different dimensions or shapes. In another embodiment the separating walls 32 are disposed at the positions corresponding to curves or corners of the target profile.

A thickness of the separating wall 32 shall not cause any disturbance to the flow of extrudate in the separator die plate flow channel 31. In some embodiments the minimum thickness of the separating walls 32 is about 0.01 mm, or about 0.05 mm, or about 0.1 mm, or about 0.15 mm, or about 0.2 mm, or about 0.3 mm, or about 0.4 mm, or about 0.5 mm, or about 0.8 mm, the maximum thickness of separating walls 32 is about 3.0 mm, or about 2.0 mm, about 1.0 mm, or about 0.9 mm, or about 0.8 mm, or about 0.6 mm, or about 0.5 mm, or about 0.4 mm, or about 0.3 mm, or about 0.2 mm, or about 0.1 mm, so long as the minimum thickness is less than or equal to the maximum thickness.

It is preferable that the separating walls 32 have a smooth surface contacting with the extrudate. In some embodiments the separating walls 32 is tapered to have a very small thickness at one or both ends so that the divided extrudate can be joined together at the exit end without causing any turbulence of flow of extrudate. In another embodiment the separating walls 32 are shorter than the separator die plate 30 so as to invaginate, at least at the exit end, into the separator die plate flow channel 31, thus the divided extrudate can be joined together before flowing into next die plate, for example, the profile die plate 40, and thereby reducing the turbulence of extrudate in next die plate.

A dimension of exit opening of the separator die plate flow channel 31 is about 1.0 to 5.0 times, or about 1.2 to 4.0 times, or about 1.5 to 3.0 times the dimension of target profile. At the positions corresponding to the thinnest part of the target profile, the dimension is preferably at least about 1.01 times, or about 1.1 times, or about 1.2 times, or about 1.5 times the dimension of target profile.

By flowing extrudate through the separator die plate 30, the flow of extrudate was divided into several streams and the flow rate in each section is easier to balance, especially for those target profile having different thickness section. Then the extrudate is distributed to the profile die plate 40. For some extrusion materials, the separator die plate can not be necessary. In this case the extrudate flows from the orifice die plate 20 to the profile die plate 40.

Figure 5:
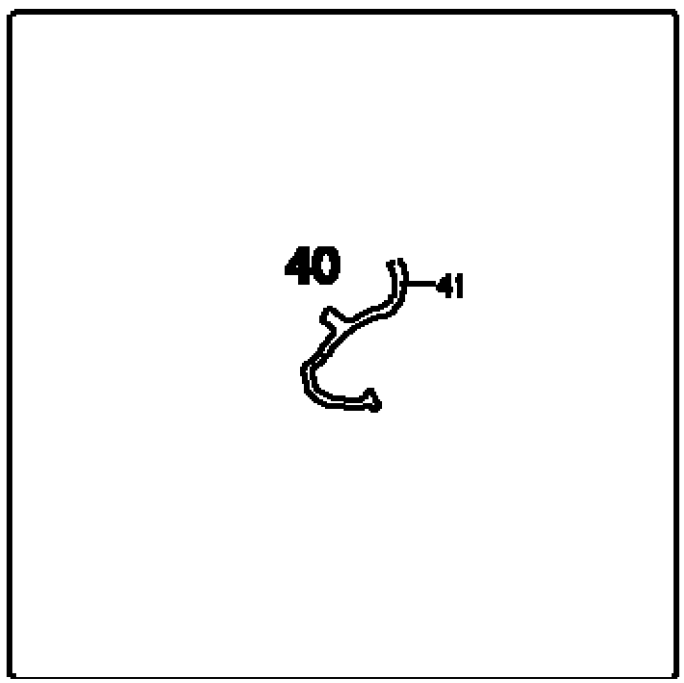
FIG. 5 is a schematic diagram of flow channel design on a side of a profile die plate where the extrudate exits in one embodiment according to the present disclosure.

Referring to the FIG. 5, in one embodiment the profile die plate 40 comprises a flow channel 41 (hereinafter "profile die plate flow channel 41") extending through the profile die plate 40 from one side to another side. That is, the profile die plate flow channel 41 has an entrance opening and an exit opening disposed on different sides, preferably on opposite sides of the separator die plate 30. The entrance opening of profile die plate channel 41 is in communication with said orifice die plate flow pool 22, when not using a separator die plate, or is in communication with said separator die plate flow channel 31.

A dimension of exit opening of the profile die plate flow channel 40 is oversized by about 1.0 to 3.0 times, or about 1.1 to 2.5 times, or 1.2 to 2.0 times the dimension of the area of thinnest parts of target profile. Typically, if the materials have a higher melt strength or a higher die swell, the dimension is smaller. At the positions corresponding to the thinnest part of the target profile, the dimension is preferably oversized by at least about 1.05 times, or about 1.1 times, or about 1.15 times, than that of the target profile.

The profile die plate 40 serves for formation of a profile having a shape and dimension closest to the target profile. After the extrudate exits from the profile die plate 40, a extruded article is expelled and transmitted to a cooling device, a flock taping process, if desired, a cutting device and a packaging device etc.

The assembly manner of each individual die plate 10, 20, 30 and 40 of the die can be any known technologies in the art. For example, each individual die plate is designed to have bolt holes for assembly.

The land length of the die according to the present disclosure is not specifically limited, depends on the dimension of desire article and extrusion speed. Typically the greater the dimension or extrusion speed is, the more the land length of the die is, whereas the greater viscosity of extrudate is, the less the land length of the die is. Preferably the profile die plate 40 has a length (thickness) less than those of pool die plate 10, orifice die plate 20, and separator die plate 30. For example, in one embodiment that a talc-filled polypropylene was used for extrusion, the length (thickness) of pool die plate 10, orifice die plate 20, separator die plate 30 and profile die plate 40 is about 10 mm, about 10 mm, about 10 mm, and about 6 mm, respectively.

During the extrusion the die is coated with a heating device, for example, a heating jacket, so as to keep the temperature of die greater than the melt temperature of the materials for extrusion. For example, in one embodiment that a talc-filled polypropylene is used for extrusion, the die is at a temperature of from about 185° C. to about 205° C., in another embodiment, and from about 190° C. to about 205° C. in yet another embodiment, and from about 190° C. to about 200° C. in yet another embodiment.

One of the advantageous of the die according to the present disclosure is application in co-extrusion of thermoplastic-contained material. Different extrusion materials can flow through a pool die plate, an orifice die plate and a separator die plate, respectively, so that the flow of different materials can be controlled and balanced respectively, and converges into the same profile die plate.

In one embodiment, the die suitable for use in co-extrusion according to the present disclosure comprises: a primary pool die plate 10 and at least one secondary pool die plate 10', each of said pool die plates 10, 10' comprising a pool die plate flow pool 15, 15', a flow groove 12, 12' in the pool die plates 10, 10' in communication with said pool die plate flow pool 15, 15', and an through orifice 11, 11' for receiving at one side an extrudate from an extruder and distributing the extrudate to said flow groove 12, 12' at another side, said pool die plate flow pool 15, 15' and said flow groove 12, 12' disposed in the same surface of the pool die plates 10, 10';

a primary orifice die plate 20 and at least one secondary orifice die plate 20' respectively arranged in use of the die adjacent said primary orifice die plate 10 and said secondary pool die plate 10', and comprising a orifice die plate flow pool 22, 22' and a plurality of through orifices 21, 21' extending through said orifice die plate 20, 20' and in communication with said pool die plate flow pool 15, 15' and said orifice die plate flow pool 22, 22', said orifice die plate flow pool 22, 22' disposed into one surface of said orifice die plate 20, 20'; and a primary separator die plate (30) and at least one secondary separator die plate (30') respectively arranged in use of the die adjacent said primary orifice die plate (20) and said secondary orifice die plate (20'), each of said separator die plates (30, 30') comprising a separator die plate flow channel (31, 31') and at least one separating wall (32, 32') disposed into said separator die plate flow channel (31, 31') along a flow direction extrudate, said separator die plate flow channel (31, 31') extending through said separator die plate (30, 30') from one side to another and in communication with said orifice die plate flow pool (22, 22'); and a profile die plate (40) arranged in use of the die adjacent both said primary separator die plate (30) and said at least one separator die plate (31') and comprising a profile die plate flow channel (41) for forming a target profile, said profile die plate flow channel (41) extending through said profile die plate (40) from one side to another and in communication with said separator die plate flow channels (31, 31').

The die further suitable for use in co-extrusion was not specifically limited to any mode of arrangement in use as long as in each group the pool die plate, the orifice die plate and the separator die plate are adjacent each other and extrudates in all separator die plates can be joined together into the profile die plate to form a target profile. In one embodiment the separator die plate 30, 30' is not essential and in this case, the profiled die plate 40 is arranged in use of the die adjacent said separator die plates 20, 20' and said profile die plate flow channel 41 is in communication with said orifice die plate flow pool 22, 22'. In one embodiment a row of the primary pool die plate 10, the primary orifice die plate 20, and the primary separator die plate 30 is arranged in parallel with a row of the secondary pool die plate 10', the secondary orifice die plate 20', and the secondary separator die plate 30', and both primary and secondary separator die plates 30, 30' are adjacent to the profile die plate 40. In another embodiment, as illustrated in the FIG. 6, the die for co-extrusion comprises in sequence the primary pool die plate 10, the primary orifice die plate 20, the secondary pool die plate 10' in which a primary separator die plate 30 is disposed, the secondary orifice die plate 20' in which an extended primary separator die plate 30 is disposed, the secondary separator die plate 30' in which an extended primary separator die plate 30 is disposed, the target profile 40. In this embodiment one opening of the secondary pool die plate through orifice 11' can be disposed on an unassembled surface of the secondary pool die plate 10', or can be disposed on an unassembled surface of the primary orifice die plate 20 and extended through the primary orifice die plate 20 to the secondary pool die plate 10', or can be disposed on an unassembled surface of the primary pool die plate 10 and extended through the primary pool die plate 10, the primary orifice die plate 20 to the secondary pool die plate 10' as illustrated in FIG. 6. Various changes or modifications in mode of assembly of die for co-extrusion can be made by a skilled artisan and shall be within the scope of the present disclosure.

The die suitable for use in co-extrusion is one embodiment applied in co-extrusion of the die according to the present disclosure. The die can be applied in co-extrusion in combination with any other types of die so long as different extrudates joined together in the profile die plate. In practice, when a formulation of extrudate is slightly changed, the rheology behaviors are changed accordingly. In this case it is necessary to modify the die so as to achieve a well balance of flow of extrudate. This process is generally called "die modifications". A technical artisan can make some modifications to the die according to the present disclosure, and such modifications shall belong to the scope of present disclosure.

Below described is one process for modification of the die according to the present disclosure, which comprises the following steps:

a) Setting the separator die plate 30, the orifice die plate 20 and the pool die plate 10 to the head of extruder and making an extrusion trial in which the flow of extrudate is divided into plurality of streams by separating walls 32;

b) Checking the velocities of each stream of extrudate, and adjusting the diameter of the orifice die plate through orifice 21 and/or the height of choke portion 14 till the velocity between all streams is the same;

c) Adding the profile die plate 40 downstream the separator die plate 30 and making extrusion trial of target profile;

d) Checking the shape performance of extruded profile, and adjusting diameters of the orifice die plate through orifices 21, and/or height of the choke portion 14 again, and/or chamfering the edge of the profile die plate flow channel 41 till the extruded profile has required thickness and smooth surface;

e) checking the flow of extrudates at positions where different streams join, adjusting the thickness of the separating walls 32 till the flow of extrudate has a smooth confluence; and f) reducing the rotating speed of screw to the critical value before breaking of flow of extrudate and making extrusion trails of small target profile, checking and adjusting the diameter of the orifice die plate through orifice 21 and/or the height of choke portion 14 till the small target profile obtained maintains a similar shape and dimension to the target profile at a lower rotating speed of screw.

In the above steps, the diameter of orifice die plate through orifice 21, height of choke portion 14, or thickness of separating wall 32 can be adjusted by any known methods. For example, the diameters of orifice die plate through orifice 21 can be increased by grinding with a drill or a grinder or can be decrease by jointing with a metal sheet or welding.

In the step e), if necessary, one or more separating walls 32 can be removed in order to get a smooth confluence of the divided melt stream (like a torpedo). Besides the step e) can be conducted at the same time as the step d).

In case of co-extrusion, steps a) to d) shall be conducted respectively by using each material one by one. And during the steps a) to d), the rotating speed of screw is typically kept the same.

In case of using recycled materials, the die modification should beforehand be made with same mixing rate of recycled material because the melt viscosity between fresh and recycled material is slightly different and that makes different melt flow.

Sizer

As mentioned above, after the extruded profile exits from the profile die plate 40, the extrude profile need undergoes a cooling process. During the cooling process, the shape and dimension of extruded profile is hardly maintained as it exits from the profile die plate 40 in a co-extrusion molding due to different cooling rates of different materials. To maintain the dimension of extrude profile and to meet the shape requirements, it is desired to provide a sizer used in cooling process.

A sizer 50 according to the present disclosure is provided to effectively maintain the shape and dimension of extruded profile during cooling process. The sizer 50 is composed of a plurality of sizing elements 51, which can be assembled to form a sizing channel 52 through which the extruded profile may pass, wherein a vacuum zone 53 is disposed in the sizing elements 51 at a position close to the sizing channel 52. By applying the vacuum zone 53, the shape of extruded profile part in proximity to the vacuum zone 53 can be maintained when it passes through the sizing channel 52 due to the difference of pressure between the channel 52 and vacuum zone 53. Herein the "vacuum zone" refers to a space having pressure less than the standard atmospheric pressure.

The vacuum zone 53 is not limited to any specific shapes and can be arranged at any desired positions depending on the deformation properties of extruded materials during cooling process. Typically a vacuum zone 53 is disposed in a sizing element closest to an extruded profile part made of a material with a greater deformation property.

When the extruded profile passes through the channel 52 formed by assembly with the sizing elements 51, it is preferable to provide a clearance between the extruded profile and the walls of the channel so as to prevent the profile from being adhered. The dimension of clearance varies from different materials of the extruded profile because different melt strength will cause different cooling and deformation behavior of extruded profile in the sizer 50. Typically the smaller the clearance is, the better achieved shape of the profile is. However, too small clearance may cause plugging issue of extruded profile. In addition, sticky materials are easier to get plugged. Thus to compromise the good shaping and easy processing, the clearance in proximity to the vacuum zone is generally set not more than 1.0 mm, or 0.8 mm, or 0.5 mm, or 0.3 mm, but not less than 0.01 mm, or 0.05 mm, or 0.08 mm, or 0.1 mm, or 0.2 mm.

Some materials take curves during the cooling process. To obtain a desired straight profile, in some embodiments a plurality of the sizers are arranged in a curved mode opposite with the curving direction of the extruded profile to effectively compensate the curvature. By doing this a straight extruded profile can be obtained. A skilled artisan can choose appropriate numbers of the sizer and arrange them in an appropriate curing mode according to the conception, and those will apparently become a part of the present disclosure, though it will be described herein in detail.

Examples

In the examples 1 and 2, a profile with irregular shape was made via co-extrusion using the die as illustrated in the FIG. 6. The materials, various extrusion parameters including the extrusion speed, the extruder temperature profile, and the rotation rate of screw was shown in the Table 1.

The materials used in the example were as follows:

TPV: Santoprene™ 121-73W175 grade available from ExxonMobil Chemical Company, which is a cured ethylene-propylene rubber dispersed in polypropylene continuous phase;

Co-extrusion material: Talc-filled polypropylene having a MFR of 1.1 to 1.3 g/10 min and comprising 68 wt % of homopolypropylene having a MFR of 1.0-1.5 g/10 min and 30 wt % of talc and 2 wt % of additives, available from Shanghai Ngai Hing Plastic Materials Co. Ltd.

Figure 6A:
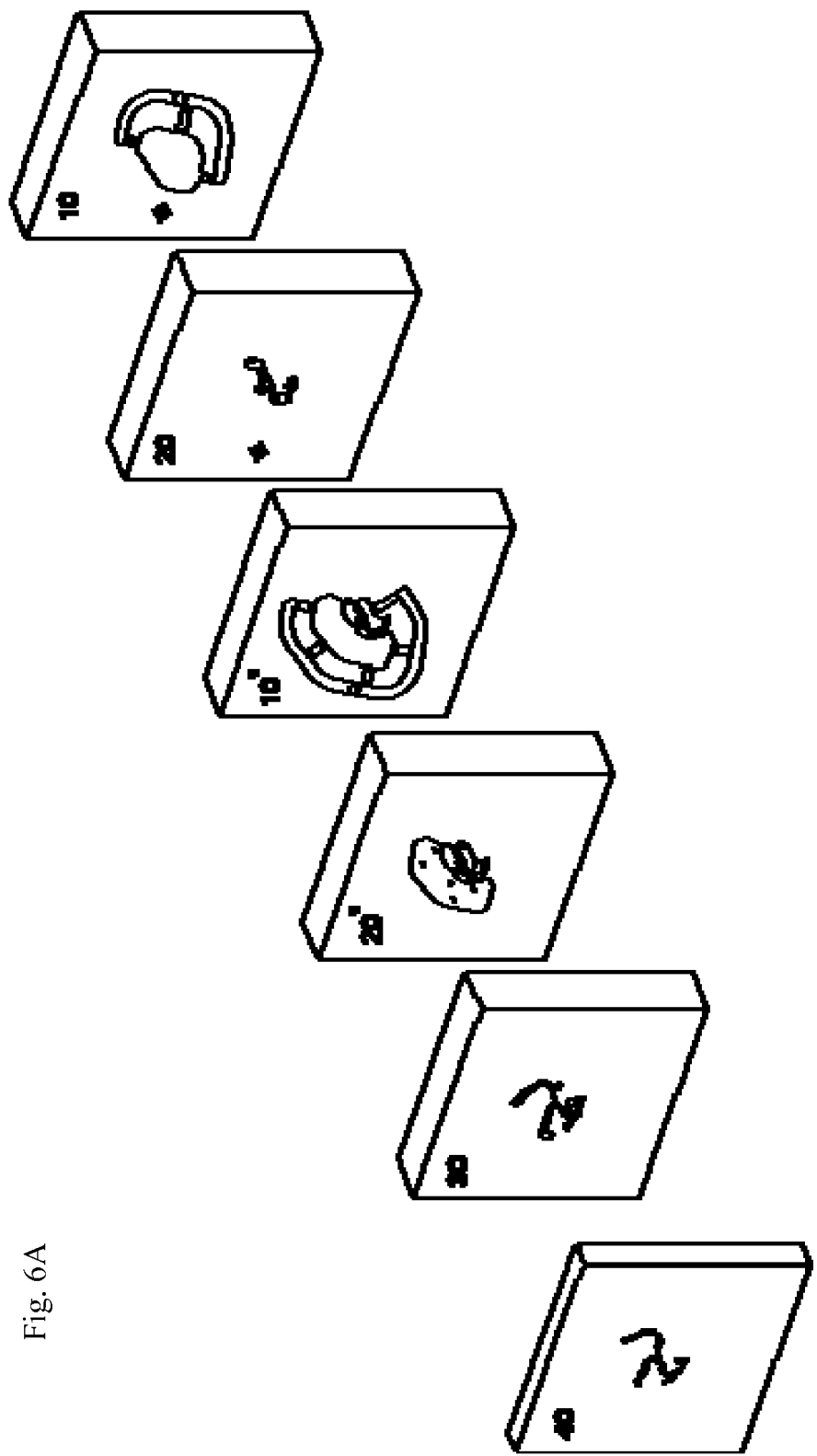
FIG. 6A is a schematic diagram of a die composed of a primary pool die plate 10, a primary orifice die plate 20, a secondary pool die plate 10', a secondary orifice die plate 20', a primary separator die plate 30 integrated with a secondary separator die plate 30', and a profile die plate 40 in another embodiment according to the present disclosure.
Figure 6B:
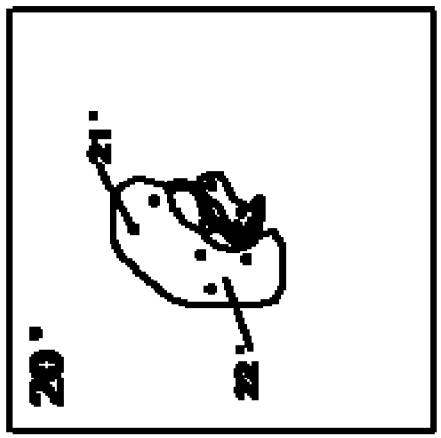
FIG. 6B is schematic diagrams of the those die plate.
Figure 6B:
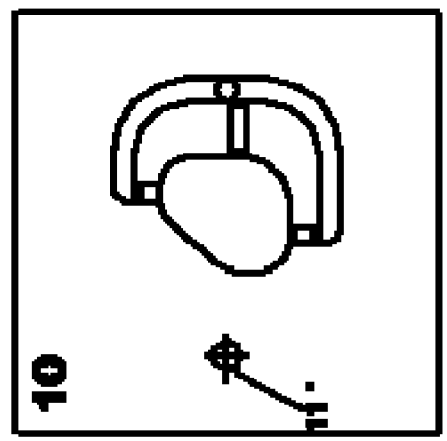
Figure 6B:
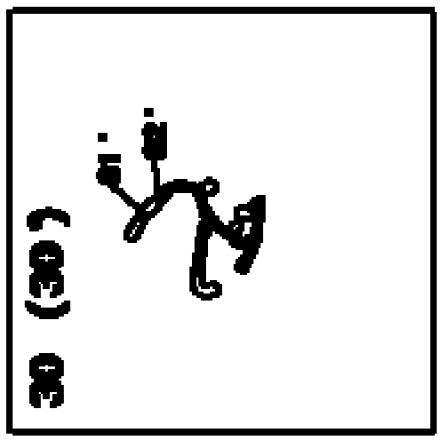
Figure 6B:
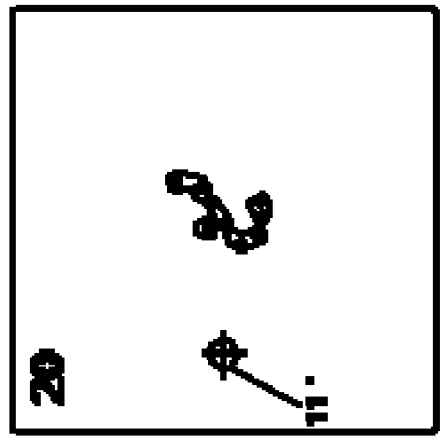
Figure 6B:
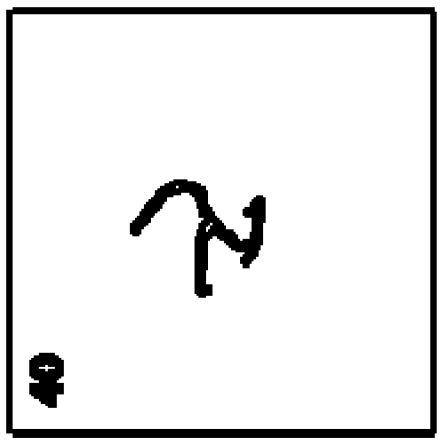
Figure 6B:
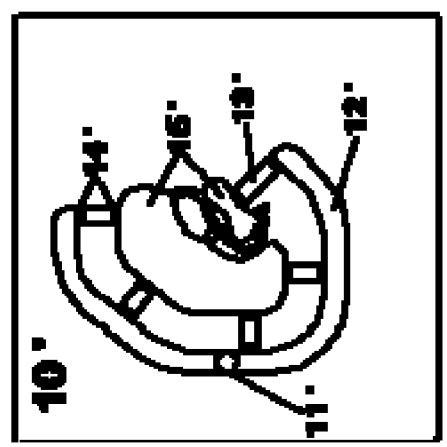

The examples 1 and 2 used the die for co-extrusion according to the present invention to produce an article used for inner belt line seal of automobile and having a irregular shape as illustrated in the profile die plate 40 of FIG. 6B. The die used in the Examples 1 and 2 were arranged in a mode as illustrated in the FIG. 6A, which comprised in sequence the primary pool die plate 10, the primary orifice die plate 20, the secondary pool die plate 10' in which a primary separator die plate 30 is disposed, the secondary orifice die plate 20' in which an extended primary separator die plate 30 is disposed, the secondary separator die plate 30' in which an extended primary separator die plate 30 is disposed, the target profile 40. The secondary pool die plate through orifice 11' was disposed on an unassembled surface of the primary pool die plate 10 and extended through the primary pool die plate 10, the primary orifice die plate 20 to the secondary pool die plate 10' as illustrated in FIG. 6. In this die, the primary pool die plate 10 and the primary orifice die plate 20 was used for TPV materials, and the secondary pool die plate 10' and the secondary orifice die plate 20' was used for the talc-filled polypropylene. The talc-filled polypropylene was passed to the secondary pool die plate 10' through an orifice disposed on the primary pool die plate 10 and extending through primary orifice die plate 20. In the separator die plate 30 (also as the secondary separator die plate 30') and the profile die plate 40, both TPV and talc-filled polypropylene were joined together and formed the profile made of multiple materials.

In the die used for the examples, the length (thickness) of the primary pool die plate 10, the primary orifice die plate 20, the secondary pool die plate 10', the secondary orifice die plate 20', the secondary separator die plate 30', and the target profile 40 was about 10 mm, about 10 mm, about 10 mm, about 10 mm about 10 mm, and about 6 mm, respectively. The diameter of through orifices in the primary orifice die plate and in the secondary orifice die plate were all set as about 1.0 mm to 2.0 mm.

Shape performance including the surface smoothness, edge tear, warpage, and silver line of the profile formed by the die according to the examples, as well as die mustache was observed by visual sight. The results were shown in the Table 1.

TABLE 1

| Parameters for Extrusion and Shape performance of extruded profile | | | | |
|---|---|---|---|---|
| | Example 1 | | Example 2 | |
| | TPV | Talc-filled PP | TPV | Talc-filled PP |
| Extruder parameters | | | | |
| Temp C1 (° C.) | 175 | 175 | 175 | 175 |
| Temp C2 (° C.) | 180 | 180 | 180 | 180 |
| Temp C3 (° C.) | 185 | 185 | 185 | 185 |
| Temp C4 (° C.) | 190 | 190 | 190 | 190 |
| Temp C5 (° C.) | 190 | 190 | 190 | 190 |
| Connector (° C.) | 175 | 195 | 175 | 195 |

TABLE 1-continued

| Parameters for Extrusion and Shape performance of extruded profile | | | | |
|---|---|---|---|---|
| | Example 1 | | Example 2 | |
| | TPV | Talc-filled PP | TPV | Talc-filled PP |
| Head & Die (° C.) | 175 | 175 | 175 | 175 |
| Melt Temp (° C.) | 175 | 190 | 177 | 185 |
| RPM | 8.2 | 9.0 | 38.0 | 37.0 |
| Screw type | Barrier | Barrier | Barrier | Barrier |
| Extruder Diameter | 65 mm | 65 mm | 65 mm | 65 mm |
| Extrusion speed | 2 m/min co-extrusion | | 8 m/min co-extrusion | |
| Shape performance of extruded profile | | | | |
| Surface smoothness | Good | Good | Good | Good |
| Edge Tear | Good | Good | Good | Good |
| Shape Performance | Good | Good | Good | Good |
| Warpage | Slight | Slight | Slight | Slight |
| Die Mustache | No | No | No | No |
| Silver line | No | No | No | No |

Figure 7:
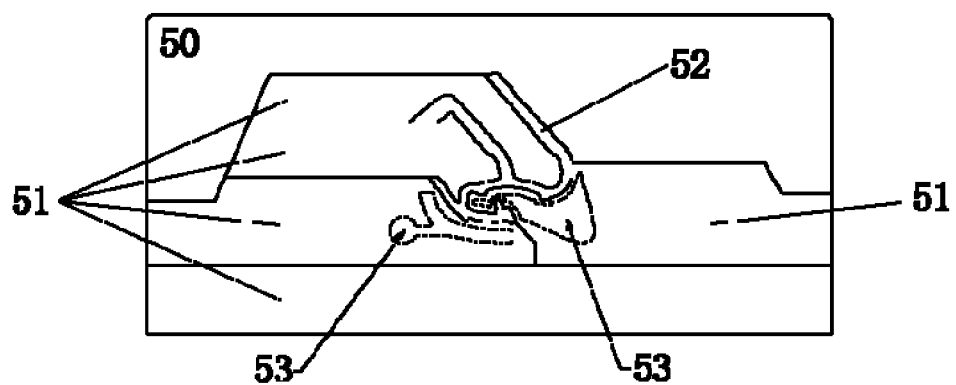
FIG. 7 is a sectional view of sizer in one embodiment according to the present disclosure.

The formed profile expelled from the profile die plate 40 was passed through the sizer 50 as illustrated in FIG. 7 during the cooling process. In these examples 1 and 2, for TPV materials, the clearance at vacuum zone side is set as 0.3 mm, while the clearance at non-vacuum zone side is set as 0.5 mm; for talc-filled polypropylene, the clearance at the vacuum zone side is set as about 0.1 mm, while the clearance at non-vacuum zone side is set as about 0.2 mm. It can be observed after passing through the sizer 50 the shape of dimension of the profile was maintained well during the cooling process.

As is apparent from the foregoing general description and the specific embodiments, while forms of the invention have been illustrated and described, various modifications can be made without departing from the spirit and scope of the invention.

What is claimed is:

1. A process of extrusion molding comprising in sequence the steps of:
   a) forming an extrudate in an extruder having a die,
      wherein the die comprises:
      a pool die plate (10) comprising a pool die plate flow pool (15), a flow groove (12) in communication with said pool die plate flow pool (15), and a through orifice (11) extending through said pool die plate (10) for receiving at one side an extrudate from an extruder head and distributing the extrudate to said flow groove (12) at another side, said pool die plate flow pool (15) and said flow groove (12) disposed in the same surface of said pool die plate (10);
      an orifice die plate (20) arranged in use of the die adjacent said pool die plate (10) and comprising at least one orifice die plate flow pool (22) and a plurality of orifice die plate through orifices (21) extending through said orifice die plate (20) from one side to another and in communication with said pool die plate flow pool (15) and said orifice die plate flow pool (22), said orifice die plate flow pool (22) grooved into a surface of said orifice die plate; and
      a profile die plate (40) arranged in use of the die adjacent said orifice die plate (20) and comprising a profile die plate flow channel (41) for forming a target profile, said profile die plate flow channel (41) extending through said profile die plate (40) from one side to another and in communication with said orifice die plate flow pool (22);
  b) passing the extrudate from one side of the pool die plate (10) of the die into the pool die plate flow pool (15);
  c) passing the extrudate through said plurality of orifice die plate through orifices (21) disposed in the orifice die plate (20) of the die from one side into the orifice die plate flow pool (22); and
  d) passing the extrudate through the profile die plate flow channel (41) disposed in the profile die plate (40) of the die to form an article having a target profile.

2. The process of claim 1 further comprising between steps c) and d) a step c') comprising passing the extrudate through a flow channel which is disposed in a separator die plate of the die, which is arranged in use of the die between said orifice die plate and said profile die plate of the die, and is divided by at least one separating wall along a flow direction of extrudate.

3. The process of claim 1, wherein said extrudate contains a thermoplastic vulcanizate material.

4. The process of claim 3, wherein said thermoplastic vulcanizate is prepared by dynamically curing a rubber with a curing agent while mixing said rubber with a thermoplastic polymer.

5. The process of claim 4, wherein said rubber is olefinic elastomeric copolymer, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, or mixtures of any two or more thereof.

6. The process of claim 5, wherein said olefinic elastomeric copolymer is ethylene-propylene rubber, propylene-based rubbery copolymer, ethylene-based plastomer or elastomer, or mixtures of any two or more thereof.

* * * * *